Jan. 2, 1962 A. H. WAKEMAN 3,015,218
FREEZER APPARATUS

Filed Jan. 23, 1958 2 Sheets-Sheet 1

INVENTOR.
Alden H. Wakeman
BY
Olson, Mechlenburger, van Holst,
Pendleton & Neuman
Attys Jan. 2, 1962     A. H. WAKEMAN     3,015,218
FREEZER APPARATUS Filed Jan. 23, 1958     2 Sheets-Sheet 2

INVENTOR.
Alden H. Wakeman

United States Patent Office 3,015,218
Patented Jan. 2, 1962

3,015,218
FREEZER APPARATUS
Alden H. Wakeman, Lake Mills, Wis., assignor to The Creamery Package Mfg. Company, Chicago, Ill., a corporation of Illinois
Filed Jan. 23, 1958, Ser. No. 710,792
6 Claims. (Cl. 62—306)

This invention relates to a freezer apparatus and, more particularly, to a freezer apparatus wherein the control of the overrun of the product being treated is of utmost importance. By the term "overrun" is meant the percentage of air in the end product.

In the commercial continuous manufacture of ice cream, for example, the control of overrun is extremely important because of its pronounced effect on the palatable nature, appearance and over-all quality and cost of the end product.

Various freezer apparatus for the continuous manufacture of ice cream have heretofore been proposed which, however, because of their design, are incapable of effectively controlling such overrun. In numerous prior freezer apparatus, the entire amount of air to be incorporated in the ice cream mix is introduced at only one station of travel of said mix. The disadvantage of this arrangement is that, unless the temperature of the mix and the amount of air injected into the mix are carefully controlled, there will be formed large bubbles or voids in the product while passing through the apparatus. The likelihood of such undesirable voids being formed is enhanced by reason of the wide variance in densities between the air and mix and, in addition, the inherent tendency of air particles coalescing with one another.

A second disadvantage associated with prior freezer apparatus is the inability of such apparatus to maintain a constant rate of flow of the product therethrough, thus resulting in a product having inconsistent characteristics.

A third disadvantage associated with certain of the prior freezer apparatus is that the mix and air are simultaneously introduced into the freezer at the inlet end thereof and the mix, while initially moving longitudinally of the freezer cylinder, remains in a relatively quiescent state until the temperature of the mix is reduced the required amount so as to effect optimum air incorporation in the mix by subsequent agitation thereof. During this interim of relative quiescence, the undesirable coalescence of the air particles occurs at a rapid rate, thereby causing nonuniform movement of air and mix through the chamber and, thus, results in wide fluctuations in overrun.

Thus, it is one of the objects of this invention to provide a freezer apparatus which is not beset with the aforementioned shortcomings of prior apparatus.

It is a further object of this invention to provide a freezer apparatus which has a large capacity and yet maintains accurate overrun control.

It is a still further object of this invention to provide a freezer apparatus which has incorporated therein a simple and effective means of attaining accurate overrun control, is easily assembled and disassembled for cleaning, and is readily adjusted to suit a wide variety of products where accurate control of the overrun thereof is important.

Further and additional objects will appear from the description, accompanying drawings, and appended claims.

In accordance with one embodiment of this invention, a freezer apparatus is provided which utilizes a pair of serially connected refrigerated chambers through which the product is caused to flow in substantially one direction. Disposed within the first of the pair of chambers is a first means for effecting continuous, vigorous agitation of the product while flowing therethrough. A second means is disposed within the second of the pair of chambers for effecting vigorous agitation of the product for at least the initial part of the product flow through said second chamber. Connected to the intake side of the first chamber is a third means for introducing a predetermined amount of fluid into the product flow. A fourth means is connected to the intake side of the second chamber to effect introduction of a predetermined amount of fluid into the product flow. The introduction of fluid into the product flow is simultaneously accomplished by the third and fourth means.

For a more complete understanding of this invention, reference should be made to the drawing, wherein.

Figure 1:
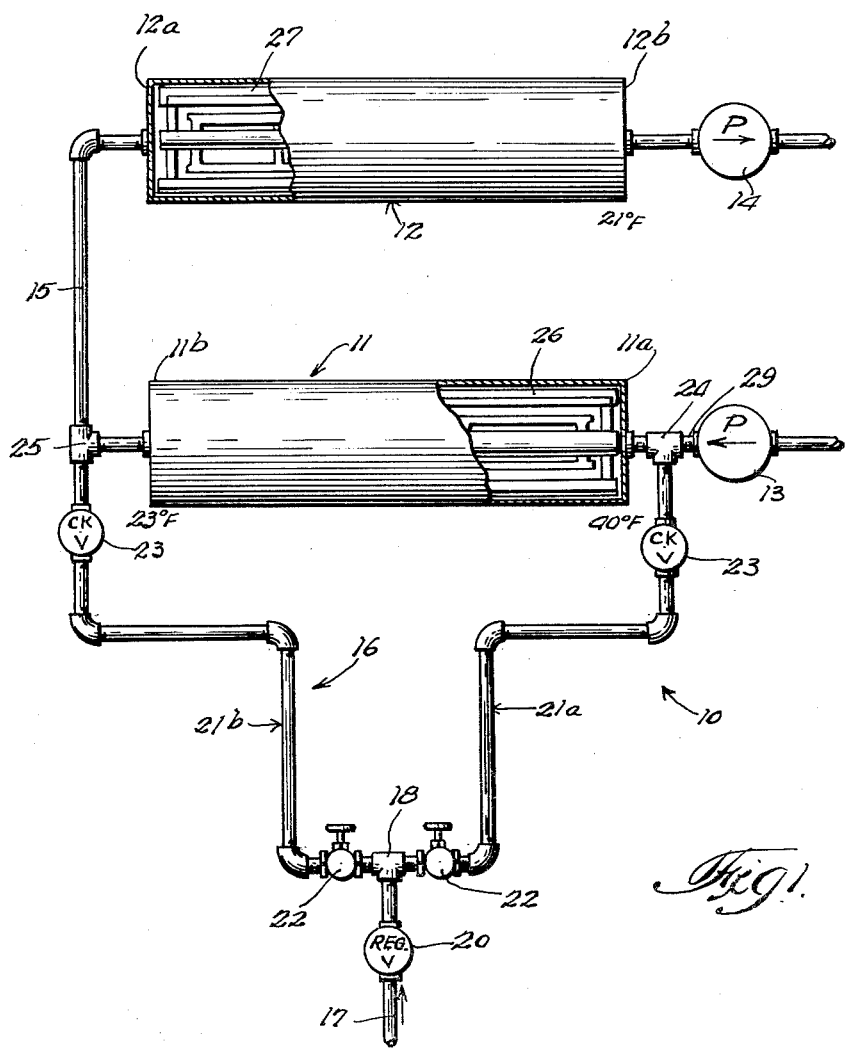
FIGURE 1 is a fragmentary diagrammatic view of the improved freezer apparatus and with the refrigerated chambers partially cut away to disclose the interior construction thereof.

One form of the improved freezer apparatus 10 is shown in FIG. 1 and comprises a pair of elongated cylindrical units 11 and 12, which are serially connected to one another. A mix-inlet pump 13 is provided which has the discharge end thereof in communication with the inlet end 11a of cylinder 11. The pump 13 is for maintaining a substantially constant input of the mix into the interior of cylinder 11. A second product-discharge pump 14 is provided which has the suction side thereof connected to the outlet end 12b of cylinder 12, and is adapted to maintain a substantially constant rate of flow of the product (aerated mix) from apparatus 10. By reason of air, or like fluid, being intermixed with the mix, in a manner to be described more fully hereinafter, while such mix is passing through the apparatus, it is essential that the volumetric capacity of pump 14 be greater than that of pump 13. The cylinders, as heretofore mentioned, are serially connected to one another by a conduit 15, which has one end thereof communicating with the discharge end 11b of cylinder 11 and the other end thereof communicating with the intake end 12a of cylinder 12.

Included as part of the apparatus 10 is an overrun control unit 16 which, as shown in the drawing, is connected to a main source of air pressure through a conduit 17. The conduit is connected to the unit 16, in this instance, by way of a T connection 18. Disposed in conduit 17, ahead of, or upstream of, T connection 18, is a regulating valve 20 which maintains a predetermined pressure at the inlet of each of the needle valves 22. Extending from T connection 18 are branches 21a and 21b, which are of substantially the same construction and, for this reason, only one of the branches will be described in detail. Forming a part of branch 21a is a metering valve 22 which is preferably of a needle valve variety. Valve 22 is normally pre-set at the time of installation and remains the same, notwithstanding any change in overrun desired. The setting of valves 22 in branches 21a and 21b is such as to insure substantially constant and equal fluid pressure at the locations where the fluid is intermixed with the mix. Thus, there is no tendency for the fluid to bypass one branch in favor of the other. Serially connected to valve 22, and disposed between valve 22 and the conduit 29, the latter connecting pump 13 to chamber 11, is a check valve 23 which is adapted to prevent back-flow of the mix and air through branch 21a. The end of branch 21a is connected to conduit 29 by means of a T connection 24. It is preferred to have the connection 24 on the discharge side of pump 13, so that the flow of the mix through connection 24 will be substantially uniform, thereby permitting greater control of the amount of air to be introduced at that station. The corresponding end of the other branch 21b terminates in a T connection 25 which is disposed within conduit 15 intermediate cylinders 11 and 12. The setting of valve 22 is such as will cause a substantial pressure drop to occur across valve 22 and thus permit a buildup of pressure in the section of conduit between valves 22 and 23 and thus overcome any sticking of valve 23 in a closed position. When a variation is desired in the amount of overrun in the product, the setting of valve 20 is adjusted, without any further adjustment of valves 22.

Figure 2:
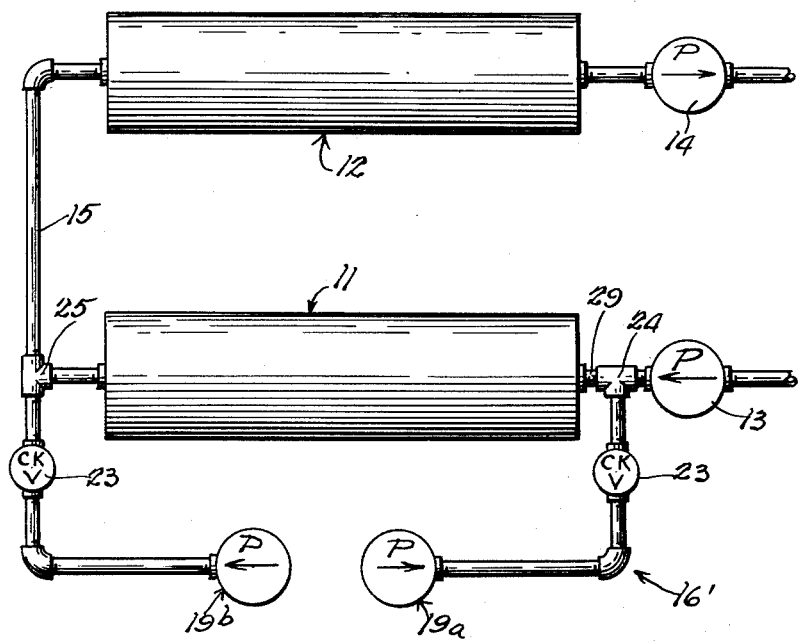
FIG. 2 is similar to FIG. 1, but showing a modified form of overrun control apparatus.

In the modified form 16′ of the overrun control unit, shown in FIG. 2, two separate air compressors 19a and 19b are utilized as sources of air under pressure, rather than one central source as shown in FIG. 1. It is preferred that each of these compressors be equipped with a variable speed drive to provide for different percentages of overrun. The advantages of the modified form 16′ are that such compressors may be mounted within the freezer frame structure, thus making such apparatus a self-contained unit, which might have numerous benefits wherein no central source of air pressure exists or where the same is inaccessible to the freezer. A further advantage of modified form 16′ is that regulating valve 20 and metering valves 22 may be omitted. Check valves 23 are still provided in each branch 21′a and 21′b of the modified form 16′ to prevent any possibility of backflow of the mix through either branch. In the modified form 16′, the rotors of pumps 13 and 14 and compressors 19a and 19b might be keyed to a common shaft, thereby insuring proper balancing of the various pumps and compressors.

In the apparatus as shown, in either FIG. 1 or FIG. 2, the mix or product is agitated throughout substantially the entire length of cylinder 11 by an agitating element 26, which is of a type similar to that shown in United States Patent No. 2,210,366. Cylinder 12, on the other hand, is provided with an element 27, diagrammatically shown in FIG. 1, which is adapted to agitate the product for only a portion of its travel through cylinder 12. Thus, in cylinder 12, the latter portion of travel of the product therethrough will be in a relatively quiescent state wherein the temperature of the product will be uniformly reduced prior to discharge from the cylinder by pump 14. In either cylinder 11 or 12, the agitating element 26 or 27 may be of any suitable construction other than that diagrammatically shown, which will provide adequate agitation of the mix so as to effect proper dispersion of minute air particles throughout the mix.

With the improved apparatus 10, the amount of air introduced initially into cylinder end 11a by control unit 16 or 16′ will be considerably less than the total amount of air to be incorporated in the end product and thus more effective incorporation of this smaller amount of air or fluid into the mix will result and the formation of large air bubbles will be avoided while the temperature of the mix is being reduced and the latter is traveling through cylinder 11. By eliminating the formation of large air bubbles, the mix and air will travel at a substantially uniform rate through chamber 11. A second amount of air is introduced in the flowing mix at the discharge end 11b of cylinder 11. The mix, when it has reached this station of travel, will have attained an optimum temperature for enabling the further amount of air to be readily incorporated in the mix so as to attain the desired overrun.

Under operating conditions the mix is normally at 40° F. when it is introduced into cylinder 11. Upon leaving cylinder 11, the temperature of the mix and air admixture is approximately 23° F. It is when the admixture is at this temperature that the second or final amount of air is combined therewith. The temperature of 23° F. for the admixture is optimum for effecting readily incorporation of the air in the admixture. The temperature of the end product, upon leaving cylinder 12, is approximately 21° F. It is preferred to have the pressure within cylinders 11 and 12 at approximately 40–50 p.s.i.

By having the cylinders 11 and 12 both refrigerated, as well as connected in series, the capacity of the apparatus may be materially increased over that of the prior art, without sacrificing overrun control. The number of freezing cylinders may be increased over that shown when increased capacity of the apparatus is desired. In such case, the number of branches forming a part of control unit 16 or 16′ will be increased accordingly. Thus, the inherent tendency of the air particles to coalesce with one another to form large air bubbles or voids in the product itself will be eliminated, resulting in substantially uniform travel of both the mix and air through the cylinders, which is of utmost importance in controlling overrun.

While several embodiments of this invention are shown above, it will be understood, of course, that the invention is not to be limited thereto, since many more modifications may be made, and it is contemplated, therefore, by the appended claims, to cover any such modifications as fall within the true spirit and scope of this invention.

I claim:

1. A freezer apparatus for ice-cream or a like product, comprising a pair of refrigerated serially connected chambers, a first pump connected to the intake side of the first of said pair of chambers to effect substantially constant product flow into the first of said pair of chambers, a second pump connected to the discharge side of the second of said pair of chambers to effect substantially constant product flow from said second chamber, the capacity of said second pump being greater than the capacity of said first pump, and gas dilution means communicating with the intake side of said first chamber and the intake side of said second chamber to effect substantially constant introduction of predetermined amounts of gas into the product flow from said first pump; said gas dilution means including a first conduit flow-regulating means disposed within said first conduit, and a pair of second conduits connected to said first conduit, one of said second conduits being connected to the intake side of said first chamber and the other second conduit being connected to the intake side of said second chamber; each of said second conduits being provided with flow-control means.

2. A freezer apparatus for ice-cream or a like product, comprising a pair of refrigerated chambers; an interconnecting conduit having one end thereof connected to the discharge side of the first chamber and the other end thereof connected to the intake side of the second chamber; a feed conduit connected to the intake side of said first chamber; a discharge conduit connected to the discharge side of said second chamber; a product feed pump connected to said feed conduit for effecting a substantially constant product flow into said first chamber; a product discharge pump connected to said discharge conduit for imparting a substantially constant product flow from said second chamber, the capacity of said discharge pump being greater than that of said feed pump; a first gas dilution means connected to said feed conduit intermediate said feed pump and the intake side of said first chamber to effect introduction of a predetermined first amount of gas into said feed conduit at a substantially constant rate and a second gas dilution means connected to said interconnecting conduit to effect introduction of a predetermined second amount of gas into said interconnecting conduit at a substantially constant rate, each of said flow means including check valve means to effect gas flow in only one direction.

3. Apparatus for controlling overrun of ice-cream or a like product while flowing through a pair of serially connected refrigerated chambers, said apparatus comprising a first conduit through which a gas under pressure flows in substantially one direction, regulating means disposed within said first conduit for maintaining a substantially constant gas pressure in said first conduit, a pair of second conduits communicating with said first conduit and through which the gas flow from said first conduit is substantially equally divided, one of said second conduits being connectable to the intake side of the first of such serially connected chambers and the other of said second conduits being connectable to the intake side of the second of such serially connected chambers, and means cooperating with said second conduits for permitting gaseous flow in only one direction therethrough.

4. A freezer apparatus for ice-cream or a like product, comprising a pair of refrigerated chambers serially connected to one another through which a product flows and is moderately agitated, a first pump connected to the intake side of the first of said pair of chambers to effect a substantially constant product flow into the first of said chambers, a second pump connected to the discharge side of the second of said pair of chambers to effect a substantially constant product flow therefrom, first air compressor means communicating with the intake side of said first chamber at a location intermediate said first chamber and the discharge side of said first pump to effect introduction of a predetermined amount of air at a substantially constant rate into the product flow from said first pump, and second air compressor means communicating with the intake side of said second chamber to effect introduction of a predetermined amount of air at a substantially constant rate into the product flow from said first chamber; the introduction of said air amounts by said first and second compressor means being simultaneous and substantially equal.

5. A freezer apparatus for ice cream or a like product having a predetermined amount of over-run, comprising a pair of serially connected refrigerated chambers through which ice cream mix is caused to flow at a predetermined substantially uniform rate, first pump means having the discharge side connected to the intake side of said first chamber for moving mix into the first chamber at a substantially uniform rate, a second pump means of greater capacity than the first pump means and having the suction side thereof connected to the discharge side of the second chamber to remove from the second chamber mix at a substantially uniform rate, first air dilution means connected to the intake side of the first chamber between the pump and the inlet of the chamber, control means for said first air dilution means to introduce air at a constant pressure and rate to obtain a predetermined addition to the flowing mix, second air dilution means connected to the discharge side of the first chamber, control means for said second air dilution means to introduce air at a constant pressure and rate to obtain a further predetermined addition to the cooled flowing mix, and agitating means in each of the chambers to effectively incorporate air into the continuous flow of mix to produce the desired percent of over-run discharged by the second pump means.

6. A freezer apparatus for ice cream or a like product, comprising a pair of serially connected refrigerated chambers, pump means connected to the intake side of the first of said chambers for impelling the product in substantially one direction and at a substantially constant flow rate through said chambers, means at the outlet of the second of said chambers for maintaining a substantially constant product flow rate from said second chamber, air dilution means connected to the intake sides of both of said chambers for simultaneously introducing air into the product flowing through said pair of chambers, and control means in cooperative engagement with said air dilution means for automatically maintaining a constant rate of flow and pressure of the air simultaneously introduced into the intake sides of both chambers.

References Cited in the file of this patent

UNITED STATES PATENTS

| | | |
|---|---|---|
| 1,442,945 | Hauk | Jan. 23, 1923 |
| 1,882,660 | Glauser | Oct. 18, 1932 |
| 1,957,707 | Glauser | May 8, 1934 |
| 2,063,066 | Vogt | Dec. 3, 1936 |
| 2,219,656 | Miller | Oct. 29, 1940 |
| 2,330,986 | Miller | Oct. 5, 1943 |
| 2,784,565 | Stalkup | Mar. 12, 1957 |